United States Patent
Kurigata

(10) Patent No.: US 9,217,949 B2
(45) Date of Patent: Dec. 22, 2015

(54) IMAGE VARIABLE MAGNIFICATION DEVICE AND IMAGE VARIABLE MAGNIFICATION METHOD

(71) Applicant: Konica Minolta, Inc., Tokyo (JP)

(72) Inventor: Yuhei Kurigata, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/454,658

(22) Filed: Aug. 7, 2014

(65) Prior Publication Data

US 2015/0055146 A1    Feb. 26, 2015

(30) Foreign Application Priority Data

Aug. 26, 2013   (JP) .................................. 2013-174999

(51) Int. Cl.
*G06K 15/00* (2006.01)
*G03G 15/041* (2006.01)
*H04N 1/00* (2006.01)

(52) U.S. Cl.
CPC .......... *G03G 15/041* (2013.01); *G03G 15/0415* (2013.01); *G06K 15/00* (2013.01); *H04N 1/00* (2013.01)

(58) Field of Classification Search
None
See application file for complete search history.

(56) References Cited

U.S. PATENT DOCUMENTS

| | | | | |
|---|---|---|---|---|
| 5,832,141 A * | 11/1998 | Ishida et al. | .................. | 382/298 |
| 6,304,333 B1 * | 10/2001 | Shaked et al. | ................. | 358/1.1 |
| 7,843,604 B2 * | 11/2010 | Higashiyama et al. | ........ | 358/1.9 |
| 2005/0052524 A1 * | 3/2005 | Isono et al. | .................... | 347/217 |
| 2007/0165283 A1 * | 7/2007 | Matsuzaki et al. | ........... | 358/3.26 |
| 2012/0140250 A1 * | 6/2012 | Ichihashi | ...................... | 358/1.2 |

FOREIGN PATENT DOCUMENTS

JP    2005318156 A    11/2005
JP    2007193143 A    8/2007

OTHER PUBLICATIONS

Notice of Reason for Refusal issued in the counterpart Japanese patent application No. 2013174999, mailed Jun. 24, 2015 (10 pages).

* cited by examiner

*Primary Examiner* — Steven Kau
(74) *Attorney, Agent, or Firm* — Osha Liang LLP

(57) ABSTRACT

Disclosed is an image variable magnification device including: a first screen processing unit to carry out a first screen processing for the original image by applying a dither threshold on a position in a dither threshold matrix, which corresponds to a position obtained by adding the shift amount; a second screen processing unit to carry out a second screen processing for the original image by applying a dither threshold on a position in the dither threshold matrix, which corresponds to a position obtained by adding the shift amount and +1 or −1; and a variable magnification processing unit to shift each pixel in an image obtained by the first screen processing, in accordance with the shift amount, and to determine a gradation value of a pixel required to be inserted due to the shift, by adopting a processing result obtained by the second screen processing unit.

8 Claims, 21 Drawing Sheets

FIG.2
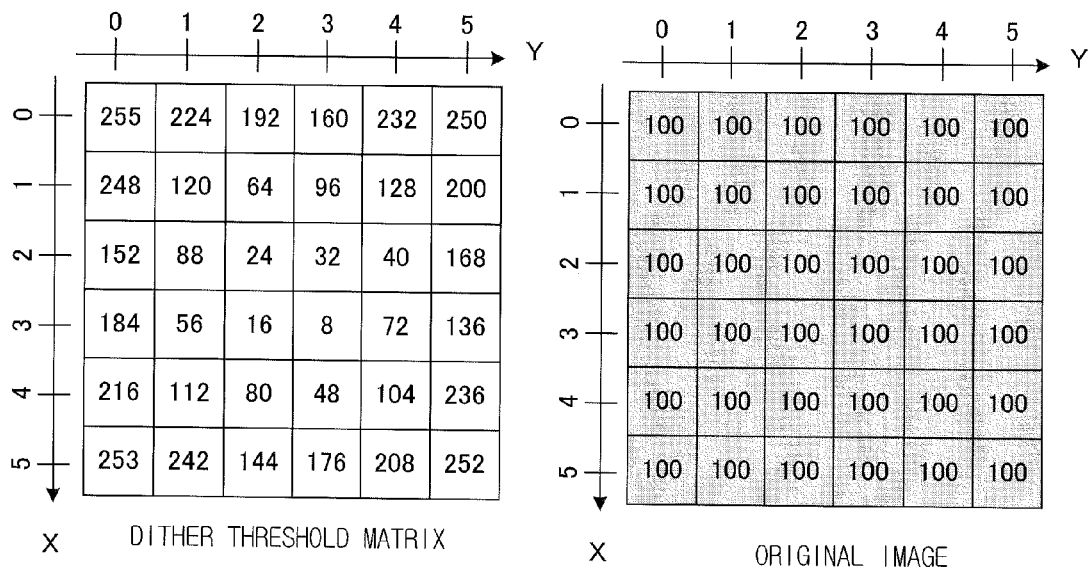
SCREEN PROCESSING
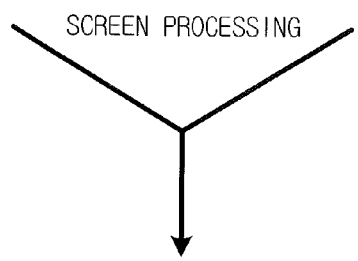
SCREEN PROCESSING RESULT
(SCREEN IMAGE)

FIG.5A

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (3,4) | (2,5) |
| (3,0) | (3,1) | (3,2) | (3,3) | (4,4) | (3,5) |
| (4,0) | (4,1) | (4,2) | (4,3) | (4,4) | (4,5) |
| (5,0) | (5,1) | (5,2) | (5,3) | (5,4) | (5,5) |

DITHER THRESHOLD COORDINATE

FIG.5B

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (2,4) | (2,5) |
| (3,0) | (3,1) | (3,2) | (3,3) | (3,4) | (3,5) |
| (4,0) | (4,1) | (4,2) | (4,3) | (4,4) | (4,5) |
| (5,0) | (5,1) | (5,2) | (5,3) | (5,4) | (5,5) |

SCREEN IMAGE

FIG.5C

| 0 | 0 | 0 | 0 | 0 | 0 |
|---|---|---|---|---|---|
| 0 | 0 | 0 | 0 | 0 | 0 |
| 0 | 0 | 1 | 0 | 1 | 0 |
| 1 | 0 | 1 | 0 | 1 | 0 |
| 1 | 1 | 1 | 0 | 1 | 1 |
| 1 | 1 | 1 | 1 | 1 | 1 |

SHIFT AMOUNT

— POSITION AT WHICH LACK PIXEL IS CAUSED DUE TO SHIFT FOR ENLARGEMENT PROCESSING

FIG.5D

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (3,2) | (2,3) | (3,4) | (2,5) |
| (4,0) | (3,1) | (4,2) | (3,3) | (4,4) | (3,5) |
| (5,0) | (5,1) | (5,2) | (4,3) | (5,4) | (5,5) |
| (6,0) | (6,1) | (6,2) | (6,3) | (6,4) | (6,5) |

DITHER THRESHOLD COODINATE

FIG.5E

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (3,2) | (2,3) | (3,4) | (2,5) |
| (4,0) | (3,1) | (4,2) | (3,3) | (4,4) | (3,5) |
| (5,0) | (5,1) | (5,2) | (4,3) | (5,4) | (5,5) |
| (6,0) | (6,1) | (6,2) | (6,3) | (6,4) | (6,5) |

SCREEN IMAGE
(FIRST SCREEN IMAGE)

FIG.6A
SHIFT IMAGE
 LACK PIXEL
FIG.6B
OUTPUT IMAGE OBTAINED BY VARIABLE
MAGNIFICATION PROCESSING
(IMAGE OBTAINED BY INTERPOLATING
LACK PIXELS)

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (2,4) | (2,5) |
| (3,0) | (3,1) | (3,2) | (3,3) | (3,4) | (3,5) |
| (4,0) | (4,1) | (4,2) | (4,3) | (4,4) | (4,5) |
| (5,0) | (5,1) | (5,2) | (5,3) | (5,4) | (5,5) |

DITHER THRESHOLD COORDINATE

FIG.9B

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (2,4) | (2,5) |
| (3,0) | (3,1) | (3,2) | (3,3) | (3,4) | (3,5) |
| (4,0) | (4,1) | (4,2) | (4,3) | (4,4) | (4,5) |
| (5,0) | (5,1) | (5,2) | (5,3) | (5,4) | (5,5) |

SCREEN IMAGE (SHIFT AMOUNT: 0)

FIG.9C

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 1 | 1 | 1 | 1 | 1 | 1 |
| 1 | 1 | 1 | 1 | 1 | 1 |
| 1 | 1 | 1 | 1 | 1 | 1 |

SHIFT AMOUNT

FIG.9D

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (2,4) | (2,5) |
| (4,0) | (4,1) | (4,2) | (4,3) | (4,4) | (4,5) |
| (5,0) | (5,1) | (5,2) | (5,3) | (5,4) | (5,5) |
| (6,0) | (6,1) | (6,2) | (6,3) | (6,4) | (6,5) |

DITHER THRESHOLD COODINATE

FIG.9E

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (2,4) | (2,5) |
| (4,0) | (4,1) | (4,2) | (4,3) | (4,4) | (4,5) |
| (5,0) | (5,1) | (5,2) | (5,3) | (5,4) | (5,5) |
| (6,0) | (6,1) | (6,2) | (6,3) | (6,4) | (6,5) |

FIRST SCREEN IMAGE

FIG.10A

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (2,4) | (2,5) |
| (3,●) | (3,1) | (3,2) | (3,3) | (3,4) | (3,5) |
| (4,●) | (4,1) | (4,2) | (4,3) | (4,4) | (4,5) |
| (5,●) | (5,1) | (5,2) | (5,3) | (5,4) | (5,5) |

DITHER THRESHOLD COORDINATE

FIG.10B

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (2,4) | (2,5) |
| (3,●) | (3,1) | (3,2) | (3,3) | (3,4) | (3,5) |
| (4,●) | (4,1) | (4,2) | (4,3) | (4,4) | (4,5) |
| (5,●) | (5,1) | (5,2) | (5,3) | (5,4) | (5,5) |

SCREEN IMAGE (SHIFT AMOUNT: 0)

FIG.10C

| 1 | 1 | 1 | 1 | 1 | 1 |
|---|---|---|---|---|---|
| 1 | 1 | 1 | 1 | 1 | 1 |
| 1 | 1 | 1 | 1 | 1 | 1 |
| 2 | 2 | 2 | 2 | 2 | 2 |
| 2 | 2 | 2 | 2 | 2 | 2 |
| 2 | 2 | 2 | 2 | 2 | 2 |

SHIFT AMOUNT

FIG.10D

| (1,0) | (1,1) | (1,2) | (1,3) | (1,4) | (1,5) |
|---|---|---|---|---|---|
| (2,0) | (2,1) | (2,2) | (2,3) | (2,4) | (2,5) |
| (3,0) | (3,1) | (3,2) | (3,3) | (3,4) | (3,5) |
| (5,●) | (5,1) | (5,2) | (5,3) | (5,4) | (5,5) |
| (6,●) | (6,1) | (6,2) | (6,3) | (6,4) | (6,5) |
| (7,●) | (7,1) | (7,2) | (7,3) | (7,4) | (7,5) |

DITHER THRESHOLD COODINATE

FIG.10E

| (1,0) | (1,1) | (1,2) | (1,3) | (1,4) | (1,5) |
|---|---|---|---|---|---|
| (2,0) | (2,1) | (2,2) | (2,3) | (2,4) | (2,5) |
| (3,0) | (3,1) | (3,2) | (3,3) | (3,4) | (3,5) |
| (5,●) | (5,1) | (5,2) | (5,3) | (5,4) | (5,5) |
| (6,●) | (6,1) | (6,2) | (6,3) | (6,4) | (6,5) |
| (7,●) | (7,1) | (7,2) | (7,3) | (7,4) | (7,5) |

SECOND SCREEN IMAGE

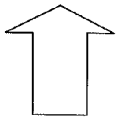

FIG.12A

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (3,4) | (2,5) |
| (3,0) | (3,1) | (3,2) | (3,3) | (4,4) | (3,5) |
| (4,0) | (4,1) | (4,2) | (4,3) | (4,4) | (4,5) |
| (5,0) | (5,1) | (5,2) | (5,3) | (5,4) | (5,5) |

DITHER THRESHOLD COORDINATE

FIG.12B

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (2,4) | (2,5) |
| (3,0) | (3,1) | (3,2) | (3,3) | (3,4) | (3,5) |
| (4,0) | (4,1) | (4,2) | (4,3) | (4,4) | (4,5) |
| (5,0) | (5,1) | (5,2) | (5,3) | (5,4) | (5,5) |

SCREEN IMAGE (SHIFT AMOUNT: 0)

FIG.12C

| −1 | −1 | −1 | −1 | −1 | −1 |
|---|---|---|---|---|---|
| −1 | −1 | −1 | −1 | −1 | −1 |
| −1 | −1 | −1 | −1 | −1 | −1 |
| 0 | 0 | 0 | 0 | 0 | 0 |
| 0 | 0 | 0 | 0 | 0 | 0 |
| 0 | 0 | 0 | 0 | 0 | 0 |

SHIFT AMOUNT

FIG.12D

| (−1,0) | (−1,1) | (−1,2) | (−1,3) | (−1,4) | (−1,5) |
|---|---|---|---|---|---|
| (0,0) | (0,1) | (0,2) | (0,3) | (0,4) | (0,5) |
| (1,0) | (1,1) | (1,2) | (1,3) | (1,4) | (1,5) |
| (3,0) | (3,1) | (3,2) | (3,3) | (3,4) | (3,5) |
| (4,0) | (4,1) | (4,2) | (4,3) | (4,4) | (4,5) |
| (5,0) | (6,1) | (6,2) | (6,3) | (6,4) | (6,5) |

DITHER THRESHOLD COODINATE

FIG.12E

| (−1,0) | (−1,1) | (−1,2) | (−1,3) | (−1,4) | (−1,5) |
|---|---|---|---|---|---|
| (0,0) | (0,1) | (0,2) | (0,3) | (0,4) | (0,5) |
| (1,0) | (1,1) | (1,2) | (1,3) | (1,4) | (1,5) |
| (3,0) | (3,1) | (3,2) | (3,3) | (3,4) | (3,5) |
| (4,0) | (4,1) | (4,2) | (4,3) | (4,4) | (4,5) |
| (5,0) | (5,1) | (5,2) | (5,3) | (5,4) | (5,5) |

SECOND SCREEN IMAGE

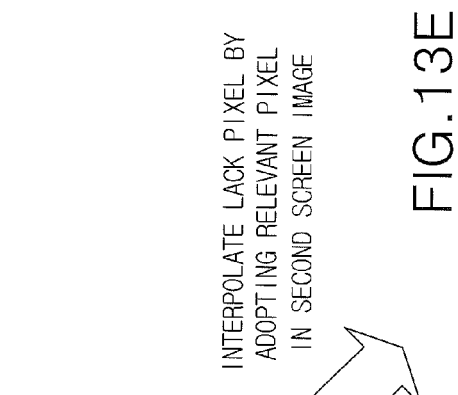

FIG.14A

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (3,4) | (2,5) |
| (3,0) | (3,1) | (3,2) | (3,3) | (4,4) | (3,5) |
| (4,0) | (4,1) | (4,2) | (4,3) | (4,4) | (4,5) |
| (5,0) | (5,1) | (5,2) | (5,3) | (5,4) | (5,5) |

DITHER THRESHOLD COORDINATE

FIG.14B

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (2,4) | (2,5) |
| (3,0) | (3,1) | (3,2) | (3,3) | (3,4) | (3,5) |
| (4,0) | (4,1) | (4,2) | (4,3) | (4,4) | (4,5) |
| (5,0) | (5,1) | (5,2) | (5,3) | (5,4) | (5,5) |

SCREEN IMAGE (SHIFT AMOUNT: 0)

FIG.14C

| 1 | 1 | 1 | 1 | 1 | 1 |
|---|---|---|---|---|---|
| 1 | 1 | 1 | 1 | 1 | 1 |
| 1 | 1 | 2 | 1 | 2 | 1 |
| 2 | 1 | 2 | 1 | 2 | 1 |
| 2 | 2 | 2 | 1 | 2 | 2 |
| 2 | 2 | 2 | 2 | 2 | 2 |

SHIFT AMOUNT

FIG.14D

| (1,0) | (1,1) | (1,2) | (1,3) | (1,4) | (1,5) |
|---|---|---|---|---|---|
| (2,0) | (2,1) | (2,2) | (2,3) | (2,4) | (2,5) |
| (3,0) | (3,1) | (4,2) | (3,3) | (4,4) | (3,5) |
| (5,0) | (4,1) | (5,2) | (4,3) | (5,4) | (4,5) |
| (6,0) | (6,1) | (6,2) | (5,3) | (6,4) | (6,5) |
| (7,0) | (7,1) | (7,2) | (7,3) | (7,4) | (7,5) |

DITHER THRESHOLD COODINATE

FIG.14E

| (1,0) | (1,1) | (1,2) | (1,3) | (1,4) | (1,5) |
|---|---|---|---|---|---|
| (2,0) | (2,1) | (2,2) | (2,3) | (2,4) | (2,5) |
| (3,0) | (3,1) | (4,2) | (3,3) | (4,4) | (3,5) |
| (5,0) | (4,1) | (5,2) | (4,3) | (5,4) | (4,5) |
| (6,0) | (6,1) | (6,2) | (5,3) | (6,4) | (6,5) |
| (7,0) | (7,1) | (7,2) | (7,3) | (7,4) | (7,5) |

SECOND SCREEN IMAGE

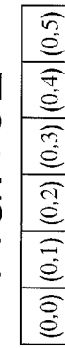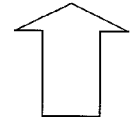

FIG.16A

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (3,4) | (2,5) |
| (4,0) | (3,1) | (3,2) | (3,3) | (4,4) | (3,5) |
| (5,0) | (4,1) | (4,2) | (4,3) | (4,4) | (4,5) |
| (6,0) | (5,1) | (5,2) | (5,3) | (5,4) | (5,5) |

DITHER THRESHOLD COORDINATE

FIG.16B

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |
| (2,0) | (2,1) | (2,2) | (2,3) | (2,4) | (2,5) |
| (3,0) | (3,1) | (3,2) | (3,3) | (3,4) | (3,5) |
| (4,0) | (4,1) | (4,2) | (4,3) | (4,4) | (4,5) |
| (5,0) | (5,1) | (5,2) | (5,3) | (5,4) | (5,5) |

SCREEN IMAGE (SHIFT AMOUNT: 0)

FIG.16C

| -1 | -1 | -1 | -1 | -1 | -1 |
|---|---|---|---|---|---|
| -1 | -1 | -1 | -1 | -1 | -1 |
| -1 | -1 | 0 | -1 | 0 | -1 |
| 0 | -1 | 0 | -1 | 0 | -1 |
| 0 | 0 | 0 | -1 | 0 | 0 |
| 0 | 0 | 0 | 0 | 0 | 0 |

SHIFT AMOUNT

FIG.16D

| (-1,0) | (-1,1) | (-1,2) | (-1,3) | (-1,4) | (-1,5) |
|---|---|---|---|---|---|
| (0,0) | (0,1) | (0,2) | (0,3) | (0,4) | (0,5) |
| (1,0) | (1,1) | (2,2) | (1,3) | (2,4) | (1,5) |
| (3,0) | (2,1) | (3,2) | (2,3) | (3,4) | (2,5) |
| (4,0) | (4,1) | (4,2) | (3,3) | (4,4) | (4,5) |
| (5,0) | (5,1) | (5,2) | (5,3) | (5,4) | (5,5) |

DITHER THRESHOLD COODINATE

FIG.16E

| (-1,0) | (-1,1) | (-1,2) | (-1,3) | (-1,4) | (-1,5) |
|---|---|---|---|---|---|
| (0,0) | (0,1) | (0,2) | (0,3) | (0,4) | (0,5) |
| (1,0) | (1,1) | (2,2) | (1,3) | (2,4) | (1,5) |
| (3,0) | (2,1) | (3,2) | (2,3) | (3,4) | (2,5) |
| (4,0) | (4,1) | (4,2) | (3,3) | (4,4) | (4,5) |
| (5,0) | (5,1) | (5,2) | (5,3) | (5,4) | (5,5) |

SECOND SCREEN IMAGE

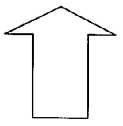

← INSERT PIXELS

INPUT IMAGE

← INSERT PIXELS

IMAGE OBTAINED BY VARIABLE MAGNIFICATION PROCESSING

ADD +1 TO
REFERENCE
COORDINATE
OF DITHER
THRESHOLD

INPUT IMAGE

←LACK PIXELS

IMAGE OBTAINED BY VARIABLE MAGNIFICATION PROCESSING

IMAGE VARIABLE MAGNIFICATION DEVICE AND IMAGE VARIABLE MAGNIFICATION METHOD

BACKGROUND OF THE INVENTION

1. Field of the Invention

The present invention relates to an image variable magnification device and an image variable magnification method for variably magnifying an image obtained by the screen processing, by inserting or deleting pixels.

2. Description of Related Art

In an image output apparatus or the like using the electrophotographic process, the positional displacement, such as the fine displacement of the image position or the magnification between the front surface and the back surface of the recording paper, the image positional displacement between the colors (misregistration) and the like, is caused by the fixing irregularity and irregularity in the paper conveyance. In order to correct the above positional displacement, the deformation process for deforming an image in two-dimension, such as the shift, the rotation, the enlargement/reduction of an image and the like, is carried out.

As the deformation process, the enlargement/reduction process for the image is preferably realized by inserting or deleting pixels. For example, in case that an image having a dot matrix form in which the pixels are arranged in a grid form extending in two directions which are perpendicular to each other (one direction is referred to as the main scanning direction (the horizontal direction or the line direction) and the other direction is referred to as the sub-scanning direction (or the vertical direction)) is enlarged in the sub-scanning direction, in a normal nearest neighbor algorithm, pixels are inserted in each interpolation period. FIG. 18A shows an original image. FIG. 18B shows an image obtained by the enlargement processing in which the image is enlarged in the sub-scanning direction in the above nearest neighbor algorithm.

On the other hand, in the above variable magnification processing, by carrying out the processing at the higher resolution, the image quality is prevented from being deteriorated. In general, in the image processing carried out in the electrophotographic process, the screen processing is carried out for the rasterized image, and then a high-resolution image obtained by the resolution conversion is output. Therefore, as shown in FIG. 19, an image variable magnification processing unit is provided at the subsequent stage of a screen processing unit, and the variable magnification processing is carried out for the image obtained by the screen processing.

However, when the variable magnification processing is carried out for the image obtained by the screen processing, the form of the screen is deformed in the image obtained by the variable magnification processing. For example, the variable magnification processing is carried out for the image (FIG. 20A) as an input image which is obtained by carrying out the screen processing for an original image in which all of the pixels have the gray color having the same density. The input image shown in FIG. 20A is an image corresponding to the form of the screen. When the variable magnification processing is carried out for the above input image, the pixels are inserted in each interpolation period. As a result, as shown in FIG. 20B, the form of the screen is deformed.

As the technology for solving the above problem, in Japanese Patent Application Publication No. 2007-193143, the following image forming apparatus is disclosed. In the image forming apparatus, the screen pattern is deformed by shifting the dither thresholds of the screen processing unit in the direction which is reverse to the shift for carrying out the image deformation, by the amount which is the same as the amount of the above shift. As a result, after the image deformation, the screen pattern is returned to a normal form.

In case that the enlargement processing is carried out for an image, it is necessary to insert pixels in each interpolation period. As shown in FIG. 21A, the image obtained by carrying out the screen processing using the screen pattern which is previously deformed so as to cancel the shift caused by inserting pixels, is prepared. When the enlargement processing is carried out for the above prepared image as an input image, as shown in FIG. 21B, the screen pattern is returned to a normal form except the portion in which the lack of the pixel is caused due to the shift processing for enlarging the image (the above lacked pixel is referred to as "lack pixel"). However, if the gradation value of the pixel to be inserted into the position of the lack pixel is not suitably determined, the screen pattern is deformed around the lack pixel.

In Japanese Patent Application Publication No. 2007-193143, the screen pattern in the position corresponding to the lack pixel caused by the enlargement processing is extracted and stored in a memory. Then, the screen pattern stored in the memory is applied to the pixel to be inserted into the position of the lack pixel caused due to the shift processing for enlarging the input image. In this method, because it is necessary to write and read the screen pattern in/from a memory, the processing becomes complex. In particular, in case that the image processing is carried out by a hardware pipe line process, the above method is not suitable.

SUMMARY

To achieve at least one of the abovementioned objects, an image variable magnification device reflecting one aspect of the present invention, comprises:

a shift amount determining unit configured to determine a shift amount for each pixel in case that an original image is variably magnified in a first direction by inserting or deleting pixels;

a first screen processing unit configured to carry out a first screen processing for each pixel in the original image by applying a dither threshold on a position in a dither threshold matrix, which corresponds to a position obtained by adding the shift amount for the pixel, which is determined by the shift amount determining unit, to a position of the pixel;

a second screen processing unit configured to carry out a second screen processing for each pixel in the original image by applying a dither threshold on a position in the dither threshold matrix, which corresponds to a position obtained by adding the shift amount for the pixel, which is determined by the shift amount determining unit, and +1 or −1 to the position of the pixel; and a variable magnification processing unit configured to shift each pixel in an image obtained by carrying out the first screen processing in the first screen processing unit, in accordance with the shift amount determined by the shift amount determining unit, and to determine a gradation value of a pixel required to be inserted due to the shift, by adopting a processing result obtained by the second screen processing unit.

Preferably, the shift amount determining unit determines the shift amount for each pixel so as to disperse positions of the pixels to be inserted or deleted, without being consecutive in a second direction perpendicular to the first direction.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 2 is a view showing an example of the dither threshold matrix used for the screen processing, the original image having the same size as the dither threshold matrix and the screen processing result;

FIGS. 5A to 5E are views showing an example of the processing result in case that the screen processing is carried out for each pixel in an image by using the coordinate obtained by adding the shift amount determined by the shift amount determining unit to the coordinate of the pixel in the image, as the dither threshold coordinate, and by applying the dither threshold obtained by referring the dither threshold matrix, and the like;

FIG. 6A is a view showing an example of the shift image prepared by the variable magnification processing unit according to the first embodiment, and FIG. 6B is a view showing an example of the output image obtained by interpolating the lack pixels;

FIG. 8 is a view showing an example of the shift amounts determined by the shift amount determining unit of the image variable magnification device according to the second embodiment;

FIGS. 9A to 9E are views showing an example of the processing result in case that the first screen processing unit according to the second embodiment carries out the screen processing for each pixel in an original image by using the coordinate obtained by adding the shift amount determined by the shift amount determining unit to the coordinate of the pixel in the original image, as the dither threshold coordinate, and by applying the dither threshold obtained by referring the dither threshold matrix, and the like;

FIGS. 10A to 10E are views showing an example of the processing result in case that the second screen processing unit according to the second embodiment carries out the screen processing for each pixel in an original image by using the coordinate obtained by adding the shift amount determined by the shift amount determining unit and +1 to the coordinate of the pixel in the original image, as the dither threshold coordinate, and by applying the dither threshold obtained by referring the dither threshold matrix, and the like;

FIGS. 11A to 11E are views showing the contents of the variable magnification processing in which the variable magnification processing unit according to the second embodiment uses the first screen image and the second screen image;

FIGS. 12A to 12E are views showing an example of the processing result in case that the second screen processing unit according to the second embodiment carries out the screen processing for each pixel in an original image by using the coordinate obtained by adding the shift amount determined by the shift amount determining unit and −1 to the coordinate of the pixel in the original image, as the dither threshold coordinate, and by applying the dither threshold obtained by referring the dither threshold matrix, and the like;

FIGS. 13A to 13E are views showing the contents of the variable magnification processing in which the variable magnification processing unit according to the second embodiment uses the first screen image and the second screen image;

FIGS. 14A to 14E are views showing an example of the processing result in case that the second screen processing unit according to the third embodiment carries out the screen processing for each pixel in an original image by using the coordinate obtained by adding the shift amount determined by the shift amount determining unit and +1 to the coordinate of the pixel in the original image, as the dither threshold coordinate, and by applying the dither threshold obtained by referring the dither threshold matrix, and the like;

FIGS. 15A to 15E are views showing the contents of the variable magnification processing in which the variable magnification processing unit according to the third embodiment uses the first screen image and the second screen image;

FIGS. 16A to 16E are views showing an example of the processing result in case that the second screen processing unit according to the third embodiment carries out the screen processing for each pixel in an original image by using the coordinate obtained by adding the shift amount determined by the shift amount determining unit and −1 to the coordinate of the pixel in the original image, as the dither threshold coordinate, and by applying the dither threshold obtained by referring the dither threshold matrix, and the like;

FIGS. 17A to 17E are views showing the contents of the variable magnification processing in which the variable magnification processing unit according to the third embodiment uses the first screen image and the second screen image;

DETAILED DESCRIPTION OF PREFERRED EMBODIMENTS

Hereinafter, preferred embodiments of the present invention will be explained with reference to the accompanying drawings.

First Embodiment

Figure 1:
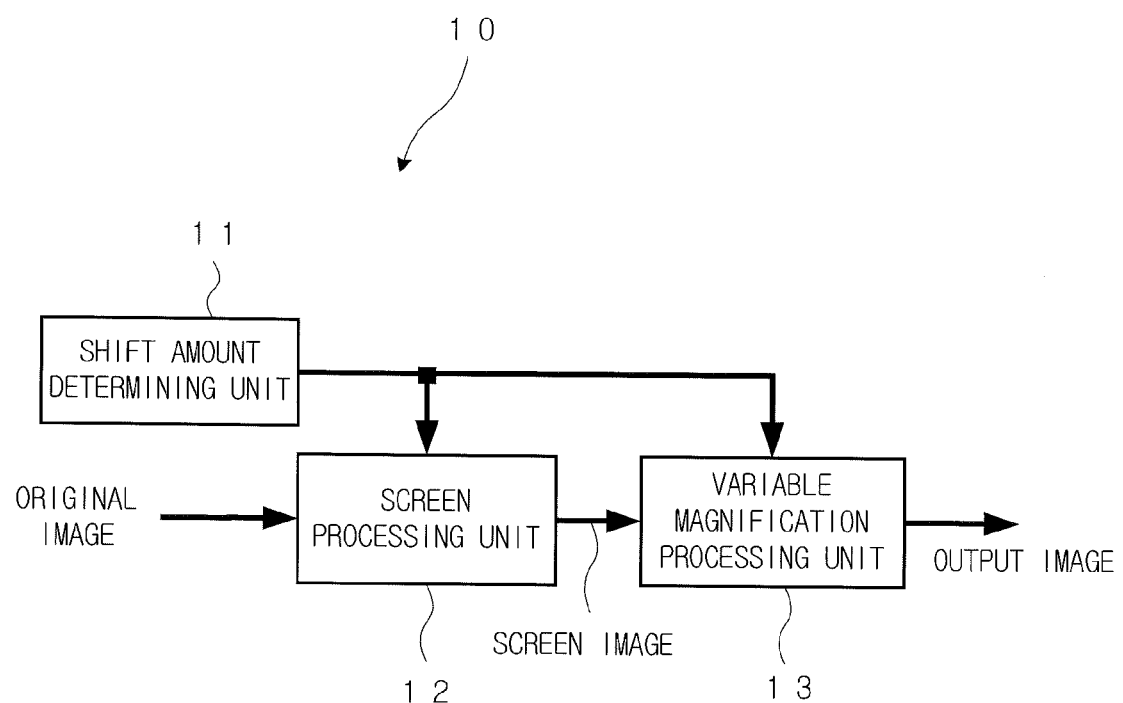
FIG. 1 is a block diagram showing the schematic configuration of the image variable magnification device according to the first embodiment.

FIG. 1 is a block diagram showing the schematic configuration of the image variable magnification device 10 according to the first embodiment. The image variable magnification device 10 comprises a shift amount determining unit 11, a screen processing unit 12 and a variable magnification processing unit 13.

The shift amount determining unit 11 determines the shift amount of each pixel according to the variable magnification ratio in case that an original image is variably magnified in a predetermined direction (the first direction) by inserting or deleting pixels. The information indicating the shift amount of each pixel, which is output from the shift amount determining unit 11, is input to the screen processing unit 12 and the variable magnification processing unit 13.

The screen processing unit 12 carries out the screen processing for each pixel in the input original image, by applying the dither threshold on the position in the dither threshold matrix, which corresponds to the position obtained by adding the shift amount determined by the shift amount determining unit 11 to the position of the pixel.

The variable magnification processing unit 13 carries out the variable magnification processing for the image obtained by carrying out the screen processing by the screen processing unit 12 (hereinafter, referred to as "screen image"). In detail, the variable magnification processing unit 13 shifts each pixel in the screen image in accordance with the shift amount determined by the shift amount determining unit 11, and outputs the image in which the gradation value of the pixel to be inserted into the position into which the pixel is required to be inserted due to the above shift, is determined by the interpolation in accordance with the gradation values around the above position, as the image obtained by the variable magnification processing (output image).

The blank portion in which the lack of the pixel is caused due to the shift processing for enlarging the original image, is referred to as the lack pixel. Further, the pixel to be inserted into the position of the lack pixel is referred to as the insert pixel.

The original image is an image having the grid-like dot matrix form in which the pixels are arranged in two directions which are perpendicular to each other (the main scanning direction (in the drawings, the horizontal direction) and the sub-scanning direction (in the drawings, the vertical direction)). Hereinafter, the case in which the original image is reduced or enlarged in the sub-scanning direction, will be explained.

Firstly, the screen processing carried out by the screen processing unit 12 is explained.

FIG. 2 shows an example of the dither threshold matrix used for the screen processing, the original image having the same size as the dither threshold matrix and the screen processing result (screen image). In this example, the shift amount is 0.

Each pixel in the original image can have the gradation value of any one of 0 to 255. In this example, the original image is a gray solid image in which all of the pixels have the gradation value of 100.

The distribution of the dither thresholds which vary according to the position of each pixel, is referred to as the dither threshold matrix. The dither threshold matrix has a certain pixel area and is repeatedly applied to the positions of the pixels.

In the dither threshold matrix shown in FIG. 2, the dither thresholds are arranged in 6×6 matrix form. Each dither threshold has anyone of the values which are within the gradation value range in which each pixel in the original image can have the gradation value.

In the normal screen processing in which the shift amount is 0, the dither threshold arranged on the position in the dither threshold matrix, which corresponds to the position of each pixel in the original image, is applied to the pixel. That is, when the coordinate of the intended pixel is (X, Y), the dither threshold arranged on the position having the coordinate (X, Y) in the dither threshold matrix is applied to the above intended pixel.

In this example, the following binarizing process is carried out as the screen processing. In case that the gradation value of the pixel is more than the corresponding dither threshold, the value 255 is output as the screen processing result. In case that the gradation value of the pixel is not more than the corresponding dither threshold, the value 0 is output as the screen processing result.

Figure 3A:
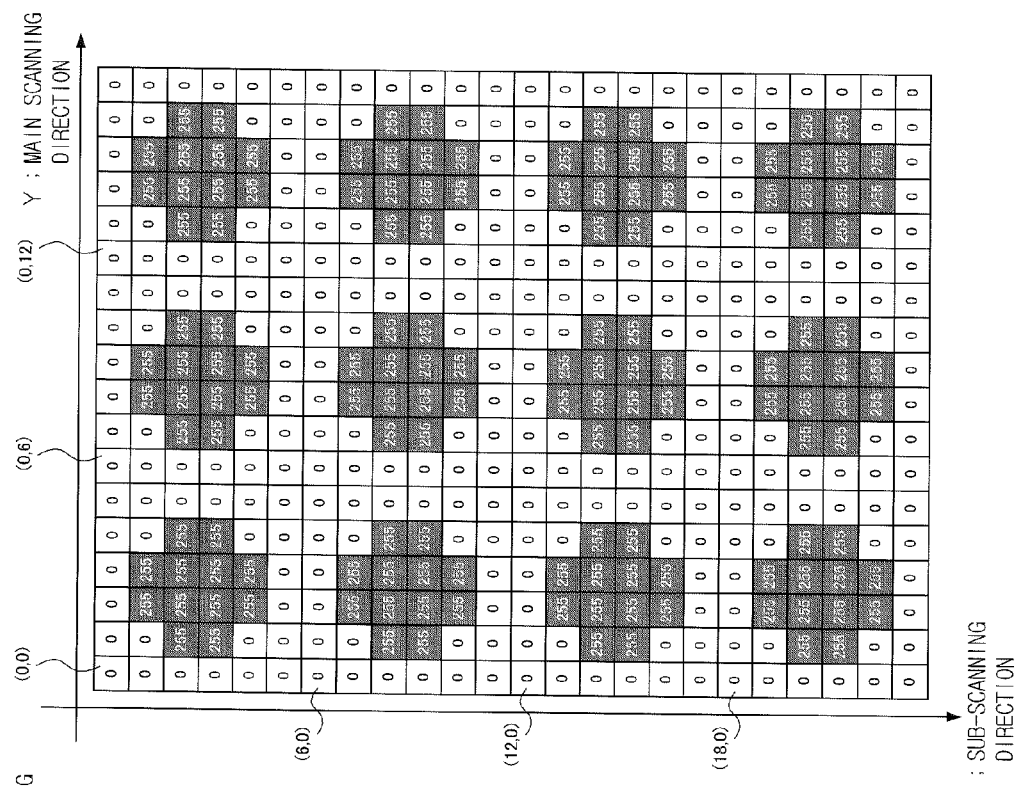
FIG. 3A is a view showing the state in which a plurality of the units of the dither threshold matrix are arranged vertically and horizontally.
Figure 3B:
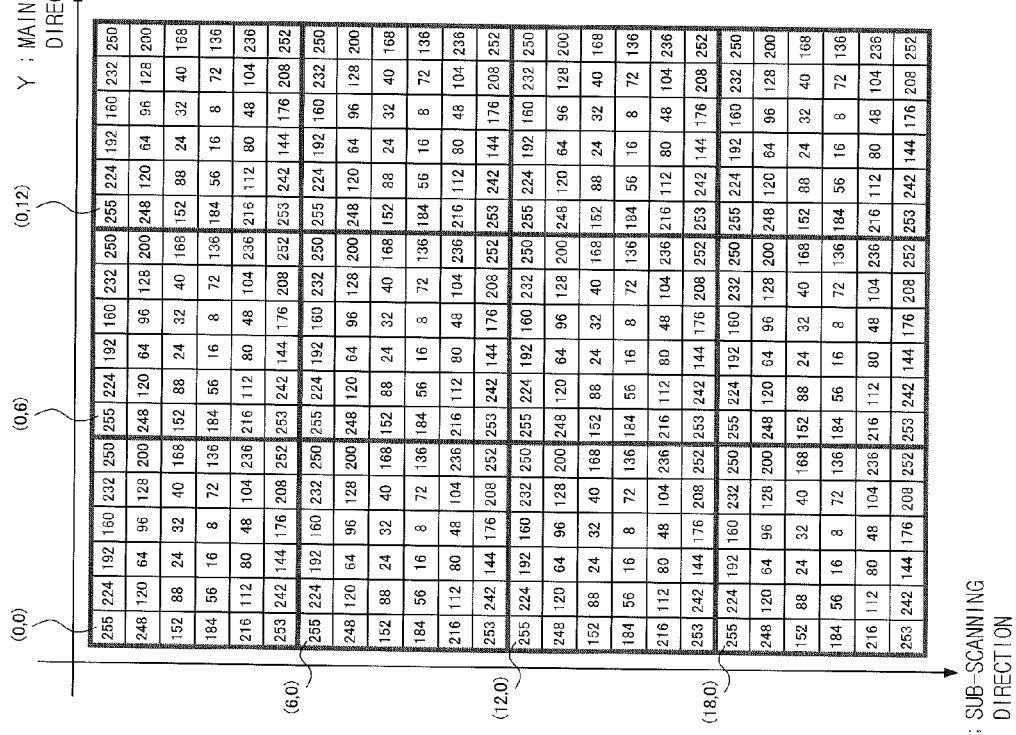
FIG. 3B is a view showing the corresponding screen processing result.

Normally, the original image is larger than one unit of the dither threshold matrix (in the example shown in FIG. 2, the dither threshold matrix has a 6×6 matrix form). Therefore, as shown in FIG. 3A, one unit of the dither threshold matrix is repeatedly used so as to arrange a plurality of the units of the dither threshold matrix vertically and horizontally. In this embodiment, the sub-scanning direction is X-direction and the main scanning direction is Y-direction. Hereinafter, each coordinate in one unit of the dither threshold matrix or in the dither threshold matrix in which a plurality of the units of the dither threshold matrix are arranged as shown in FIG. 3A, is referred to as the dither threshold coordinate. FIG. 3B shows the screen image obtained by carrying out the screen processing for the gray solid image having the same size as the dither threshold matrix shown in FIG. 3A by using the dither threshold matrix of FIG. 3A at the shift amount of 0.

In an actual hardware, only one unit of the dither threshold matrix is stored. With respect to each of X-direction and Y-direction, the remainder is calculated by dividing the coordinate of the intended pixel in each direction (in case that the shift amount is not 0, the coordinate which is obtained by adding the shift amount) by the size of the unit of the dither threshold matrix in the direction. Then, the unit of the dither threshold matrix is referred by using the above calculated remainder as the dither threshold coordinate, and the dither threshold corresponding to the intended pixel is obtained.

The screen processing unit 12 carries out the screen processing for each pixel in the original image by using the coordinate (dither threshold coordinate) obtained by adding the shift amount determined by the shift amount determining unit 11 to the coordinate of the pixel in the original image, and by applying the dither threshold obtained by referring the dither threshold matrix.

For example, in case that the image is enlarged or reduced in the sub-scanning direction, when the shift amount determining unit 11 determines 1 as the shift amount for shifting the pixel having the coordinate (0, 0) in the sub-scanning direction (X-direction), the screen processing is carried out for the above pixel by applying the dither threshold arranged on the dither threshold coordinate (1, 0).

Figure 4:
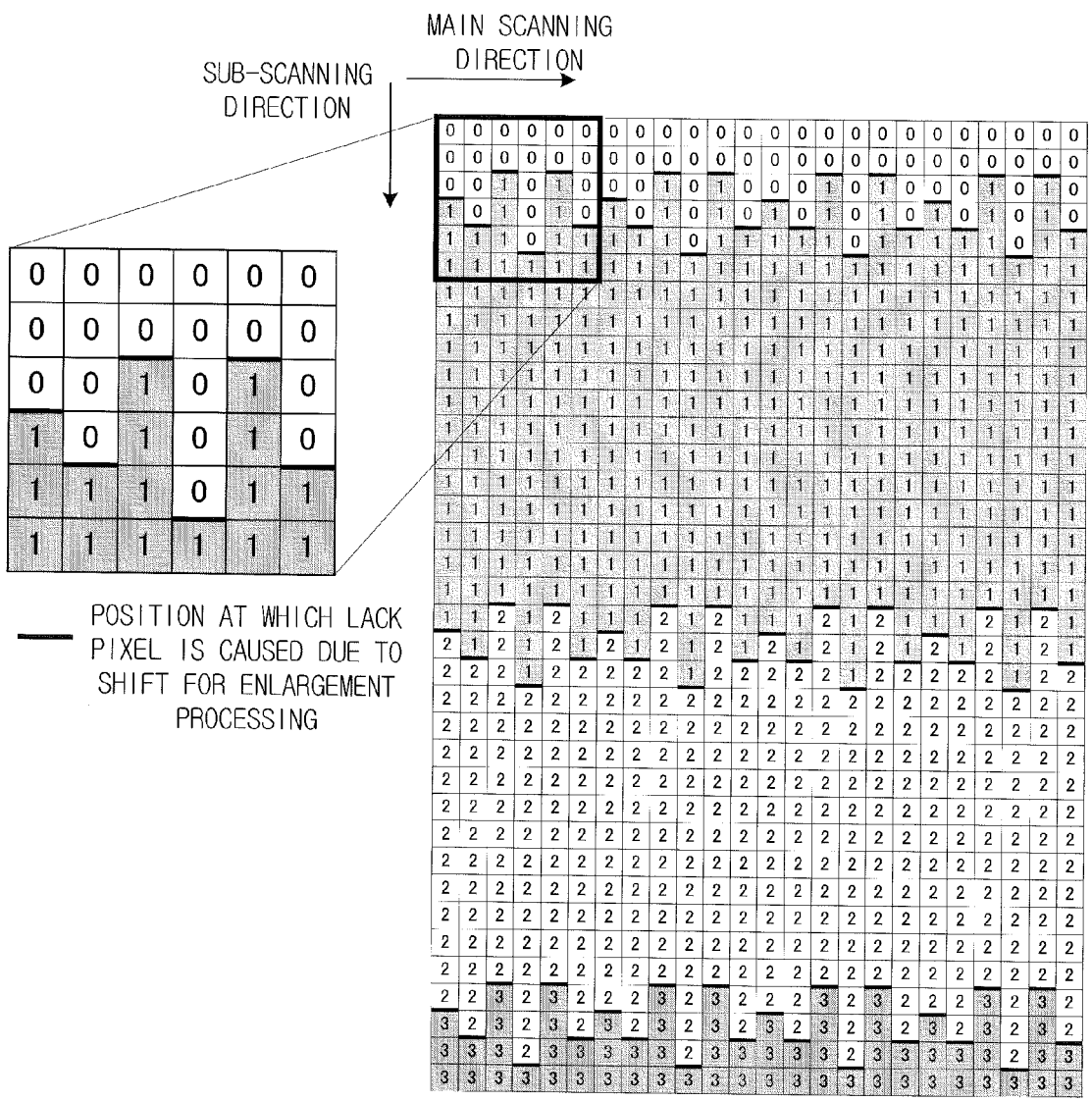
FIG. 4 is a view showing an example of the shift amounts determined by the shift amount determining unit according to the first embodiment.

FIG. 4 shows an example of the shift amounts determined by the shift amount determining unit 11. As described above, the image is enlarged or reduced in the sub-scanning direction. In FIG. 4, on the position of each pixel in the original image, the value indicating the shift amount of the pixel is entered. At the border (drawn in the bold line in the drawings) at which the value indicating the shift amount is increased, the lack pixel is caused due to the shift processing for enlarging the image.

In the first embodiment, the shift amount determining unit 11 determines the shift amount of each pixel so as to disperse the positions of the pixels to be inserted or deleted, without being consecutive in the direction (the second direction) perpendicular to the enlargement/reduction direction (the first direction). In this example, because the image is enlarged in the sub-scanning direction, the shift amount is determined so as for the positions of the lack pixels not to be consecutive in the main scanning direction, that is, so as to disperse the positions of the lack pixels in the sub-scanning direction.

Figure 21A:
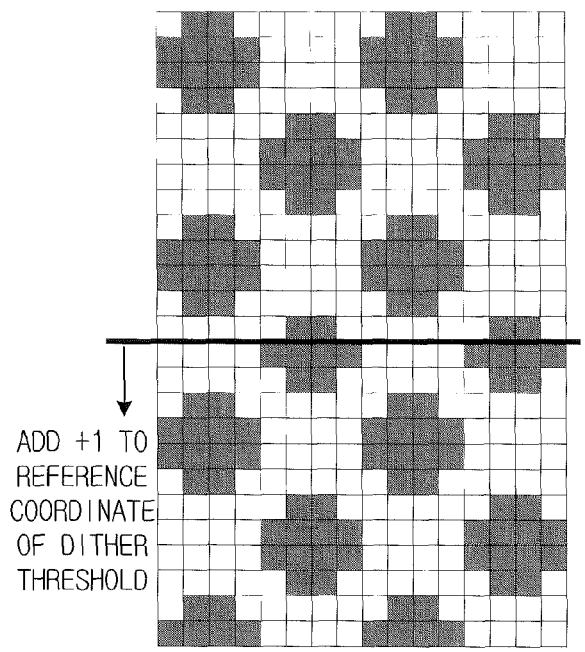
FIG. 21A is a view showing an image obtained by carrying out the screen processing using the screen pattern which is previously deformed so as to cancel the shift caused by inserting pixels.
Figure 21B:
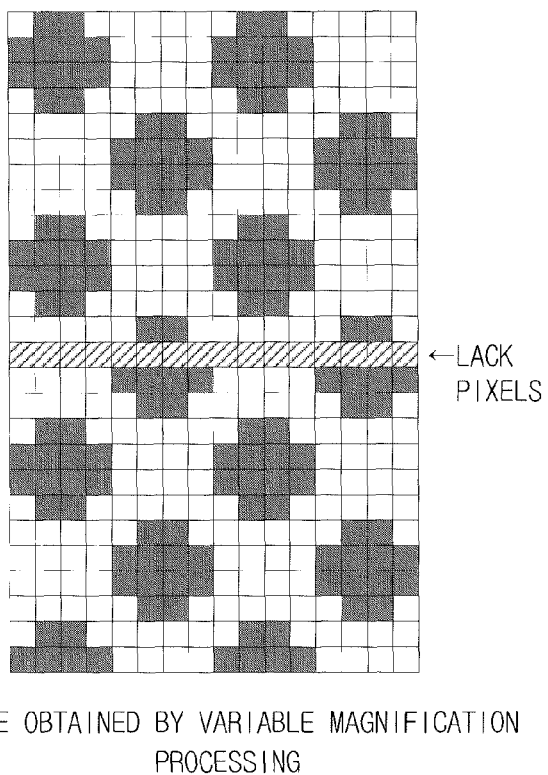
FIG. 21B is a view showing the image obtained by carrying out the enlargement processing for the image shown in FIG. 21A.

If the shift amount of each pixel is determined so as to arrange the lack pixels on the identical line in the main scanning direction, as shown in FIG. 21, the lack pixels are caused on the identical line in the main scanning direction. In this case, because the lack pixels are consecutive on the identical line in the main scanning direction, it is easy to visually recognize the deterioration in the form of the screen. Further, when the gradation value of the insert pixel to be inserted into the position of the lack pixel is determined by the interpolation in accordance with the gradation values around the lack pixel, the reference pixels used for the interpolation are only the pixels which are upwardly and downwardly adjacent to the lack pixel because the lack pixels are consecutive in the main scanning direction (horizontal direction). Therefore, when the pixel value of the insert pixel is estimated in accordance with the reference pixels, the precision of the estimated pixel value is deteriorated. As a result, the image quality is deteriorated.

The shift amount determining unit 11 according to the first embodiment, determines the shift amount so as not to cause the above problem.

FIGS. 5A to 5E show an example of the processing result in case that the screen processing is carried out for each pixel in an original image by using the coordinate obtained by adding the shift amount determined by the shift amount determining unit 11 to the coordinate of the pixel in the original image, as the dither threshold coordinate, and by applying the dither threshold obtained by referring the dither threshold matrix, and the like.

FIG. 5A shows the dither threshold matrix in case that the shift amount of each pixel in the original image having 6×6 matrix is 0. In case that the shift amount is 0, the coordinate of each pixel in the original image becomes the dither threshold coordinate corresponding to each pixel. FIG. 5B shows the screen image which is the result obtained by the screen processing for the original image having 6×6 matrix in which all of the pixels have the gray color (having the gradation value of 100). In this case, the screen processing is carried out by using the dither threshold coordinate shown in FIG. 5A and by applying the dither threshold obtained by referring the dither threshold matrix of FIG. 3A. Further, in each pixel, the dither threshold coordinate of the dither threshold applied to the pixel is indicated.

FIG. 5C shows the shift amount of each pixel in the original image, which is determined by the shift amount determining unit 11. FIG. 5D shows each dither threshold coordinate obtained by adding each shift amount shown in FIG. 5C to each dither threshold coordinate shown in FIG. 5A. Each dither threshold coordinate of FIG. 5D is obtained by adding each shift amount of FIG. 5C to the coordinate of each pixel in the original image (adding the shift amount to the coordinate of the sub-scanning direction).

FIG. 5E shows the screen image which is the result obtained by the screen processing for the original image having 6×6 matrix in which all of the pixels have the gray color (having the gradation value of 100). In this case, the screen processing is carried out by using the dither threshold coordinate shown in FIG. 5D and by applying the dither threshold obtained by referring the dither threshold matrix of FIG. 3A. Like FIG. 5B, in each pixel, the dither threshold coordinate of the dither threshold applied to the pixel is indicated.

FIG. 6A shows the shift image obtained by shifting each pixel in the screen image of FIG. 5E in the sub-scanning direction by the shift amount shown in FIG. 5C, by using the variable magnification processing unit 13. In the shift image, the lack pixels are caused.

FIG. 6B shows the image (output image) obtained by the variable magnification processing in which the insert pixel is inserted into the position of each lack pixel in the shift image shown in FIG. 6A. The variable magnification processing unit 13 determines the gradation value of each insert pixel by the interpolation in accordance with the gradation values around the lack pixel. Also in FIGS. 6A and 6B, in each pixel, the dither threshold coordinate of the dither threshold applied to the pixel is indicated.

In the output image of FIG. 6B, the form of the screen is maintained in the portion except the insert pixels. Further, because the insert pixels are dispersed, the deformation of the form of the screen is not remarkable at the position of the insert pixel. Further, because the gradation value of each insert pixel is determined by the interpolation in accordance with the gradation values of the pixels except the insert pixels which cause the form of the screen to be maintained (the gradation values of the pixels arranged around the insert pixel), the form of the screen is reflected on the gradation value of the insert pixel. In the whole of the output image including the insert pixels, it is possible to suppress the deformation of the form of the screen.

Further, because each shift amount is determined so as to disperse the insert pixels without being consecutive in the direction perpendicular to the enlargement/reduction direction, it is difficult to visually recognize the deterioration in the form of the screen. Because the gradation value of each insert pixel can be precisely determined in accordance with many pixels arranged around the insert pixel, the deterioration in the image quality, which is caused due to the interpolation, can be suppressed low.

Second Embodiment

Figure 7:
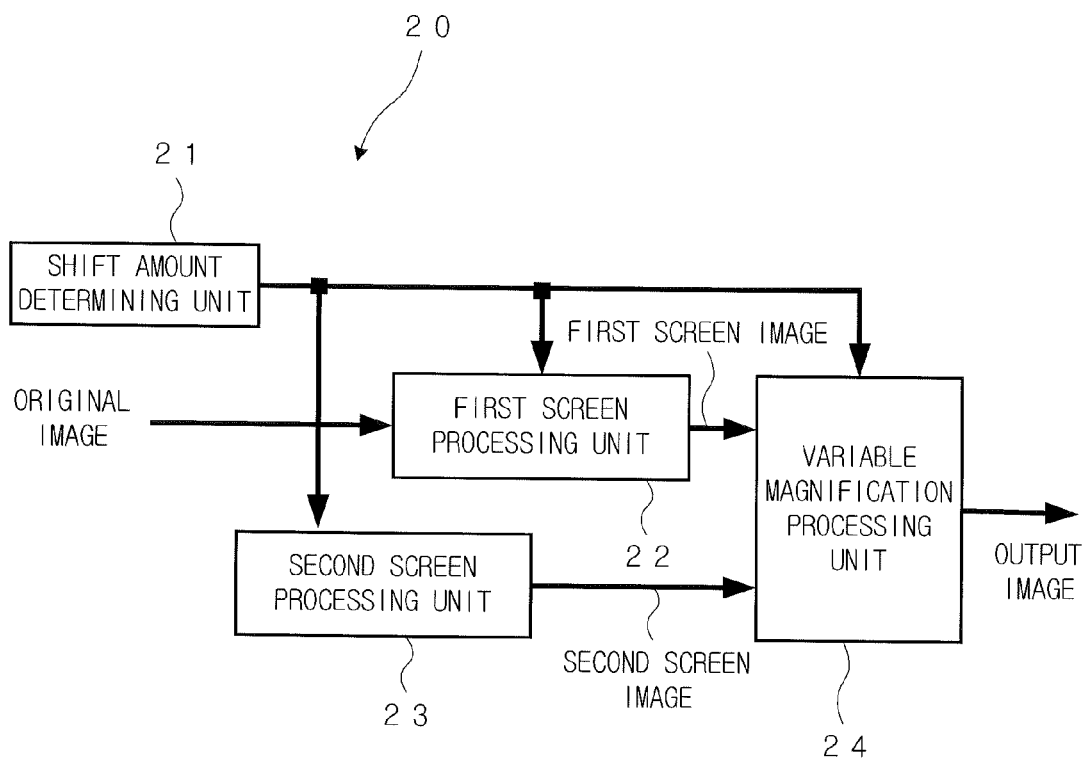
FIG. 7 is a block diagram showing the schematic configuration of the image variable magnification device according to the second embodiment and the third embodiment.
Figure 18A:
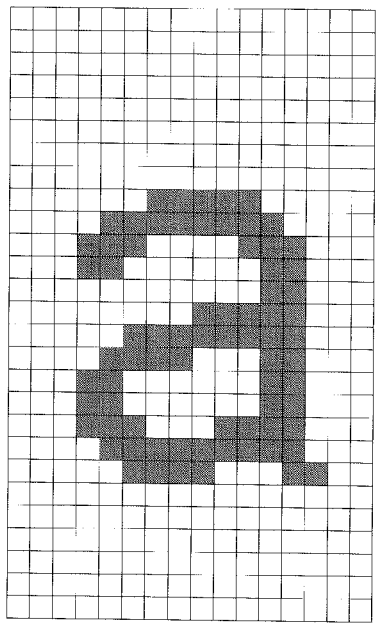
FIG. 18A is a view showing an original image and FIG. 18B is a view showing an image obtained by the enlargement processing in which the original image is enlarged in the sub-scanning direction in the nearest neighbor algorithm.
Figure 18B:
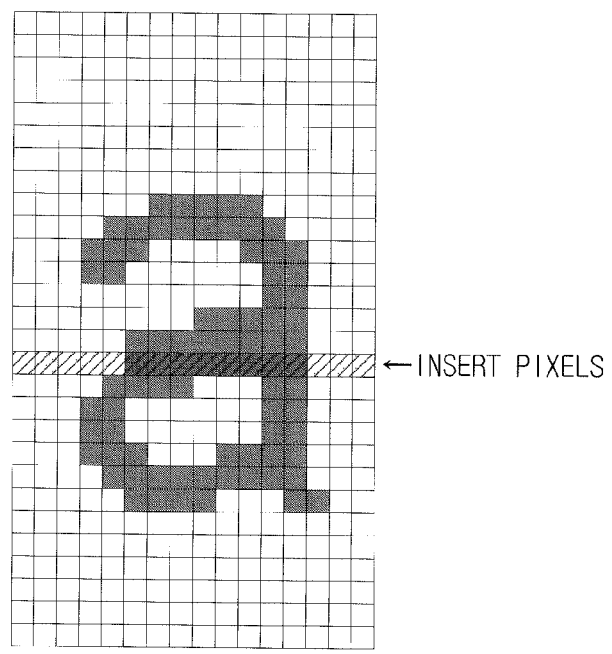
Figure 19:
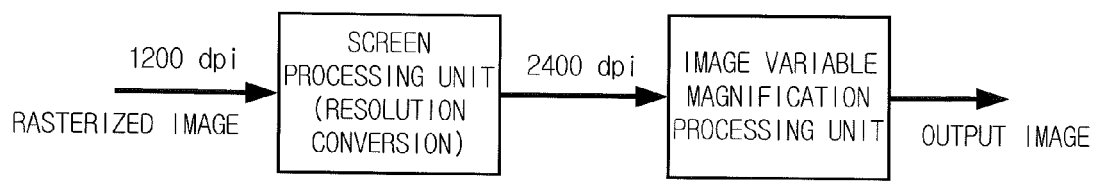
FIG. 19 is a block diagram showing the configuration of a conventional image variable magnification device.
Figure 20A:
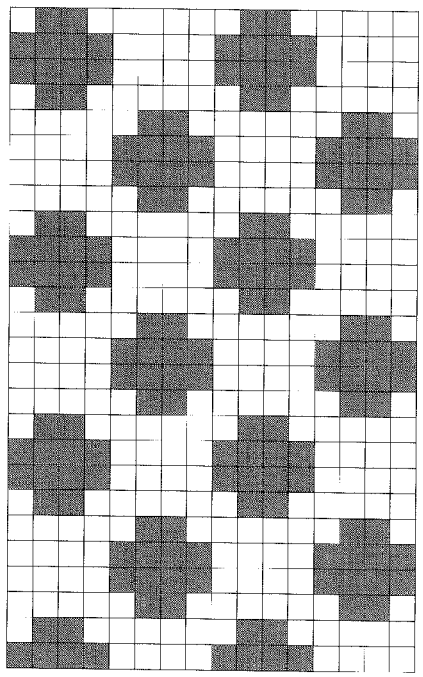
FIG. 20A is a view showing the image obtained by carrying out the screen processing.
Figure 20B:
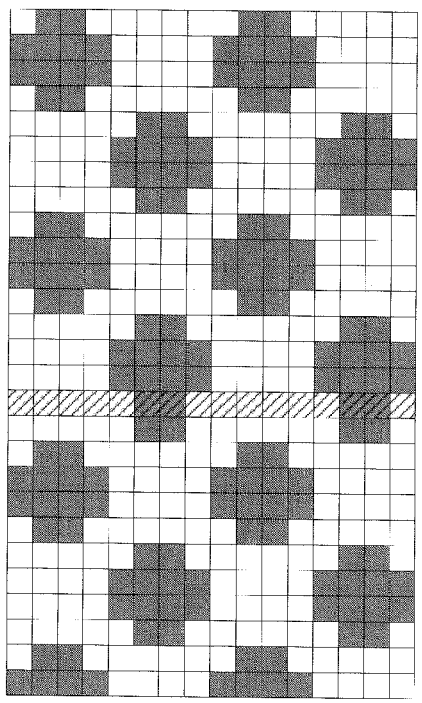
FIG. 20B is a view showing the image obtained by carrying out the enlargement processing for the image shown in FIG. 20A in the nearest neighbor algorithm.

FIG. 7 is a block diagram showing the schematic configuration of the image variable magnification device 20 according to the second embodiment. The image variable magnification device 20 comprises a shift amount determining unit 21, a first screen processing unit 22, a second screen processing unit 23 and a variable magnification processing unit 24.

The shift amount determining unit 21 determines the shift amount of each pixel according to the variable magnification ratio in case that an original image is variably magnified in a predetermined direction (the first direction) by inserting or deleting pixels. The information indicating the shift amount of each pixel, which is output from the shift amount determining unit 21, is input to the first screen processing unit 22, the second screen processing unit 23 and the variable magnification processing unit 24.

The first screen processing unit 22 executes the same operation as the screen processing unit 12 according to the first embodiment. That is, the first screen processing unit 22 carries out the screen processing for each pixel in the input original image, by applying the dither threshold on the position in the dither threshold matrix, which corresponds to the position obtained by adding the shift amount determined by the shift amount determining unit 21 to the position of the pixel.

The second screen processing unit 23 carries out the screen processing for each pixel in the original image, by applying the dither threshold on the position in the dither threshold matrix, which corresponds to the position obtained by adding the shift amount of the pixel, which is determined by the shift amount determining unit 21 and +1 or −1, to the position of the pixel.

The variable magnification processing unit 24 shifts each pixel in the first screen image obtained by carrying out the screen processing by the first screen processing unit 22, in accordance with the shift amount determined by the shift amount determining unit 21. Further, the variable magnification processing unit 24 outputs the image in which the gradation value of the pixel to be inserted into the position into which the pixel is required to be inserted due to the above shift, is determined by applying the processing result obtained by the second screen processing unit 23 (the second screen image), as the image obtained by the variable magnification processing (output image).

In the image variable magnification device 20 according to the second embodiment, the shift amount determined by the shift amount determining unit 21 is not required to be determined so as to disperse the positions of the pixels to be inserted or deleted, without being consecutive in the direction perpendicular to the enlargement/reduction direction. The pixels to be inserted or deleted may be consecutive.

Figure 8:
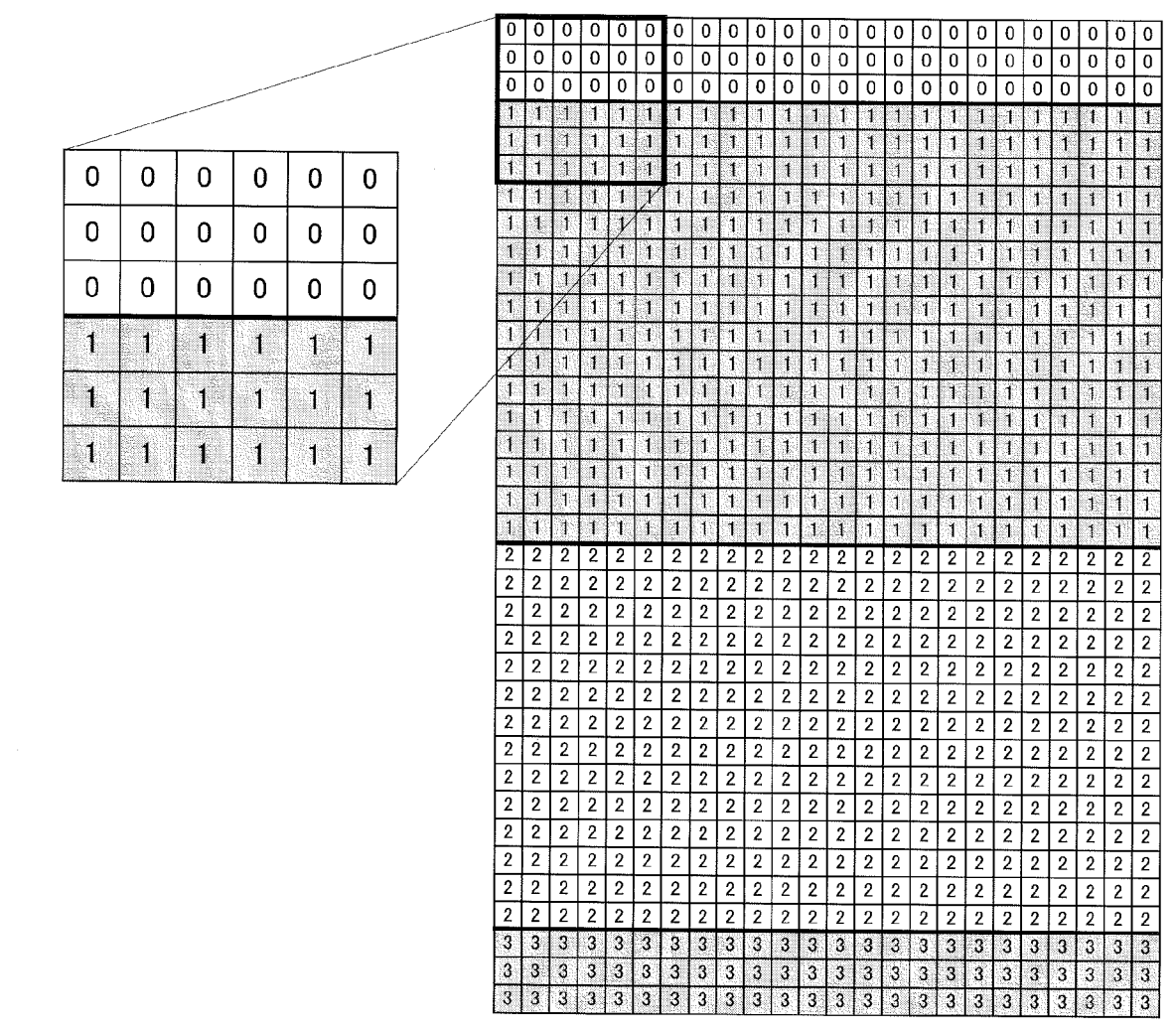

FIG. 8 shows an example of the shift amounts determined by the shift amount determining unit 21. In FIG. 8, on the position of each pixel in the original image, the value indicating the shift amount of the pixel is entered. At the border (drawn in the bold line in the drawings) at which the value indicating the shift amount is increased, the lack pixel is caused due to the shift processing for enlarging the image.

In the example shown in FIG. 8, the shift amount determining unit 21 determines the shift amount of each pixel so as for the pixels to be inserted or deleted to be consecutive in the direction perpendicular to the enlargement/reduction direction. That is, the shift amount is determined so as to arrange the lack pixels caused due to the shift processing for enlarging the original image, on the identical line in the main scanning direction.

Firstly, the case in which the shift amount obtained by adding +1 to the shift amount determined by the shift amount determining unit 21 is used in the second screen processing unit 23, will be explained.

FIGS. 9A to 9E show an example of the processing result in case that the first screen processing unit 22 carries out the screen processing for each pixel in an original image by using the coordinate obtained by adding the shift amount determined by the shift amount determining unit 21 to the coordinate of the pixel in the original image, as the dither threshold coordinate, and by applying the dither threshold obtained by referring the dither threshold matrix, and the like.

FIG. 9A shows the dither threshold matrix in case that the shift amount of each pixel in the original image having 6×6 matrix is 0. In case that the shift amount is 0, the coordinate of each pixel in the original image becomes the dither threshold coordinate corresponding to each pixel. FIG. 9B shows the screen image which is the result obtained by the screen processing for the original image having 6×6 matrix in which all of the pixels have the gray color (having the gradation value of 100). In this case, the screen processing is carried out by using the dither threshold coordinate shown in FIG. 9A and by applying the dither threshold obtained by referring the dither threshold matrix of FIG. 3A. Further, in each pixel, the dither threshold coordinate of the dither threshold applied to the pixel is indicated.

FIG. 9C shows the shift amount of each pixel in the original image, which is determined by the shift amount determining unit 21. FIG. 9D shows each dither threshold coordinate obtained by adding each shift amount shown in FIG. 9C to each dither threshold coordinate shown in FIG. 9A. Each dither threshold coordinate of FIG. 9D is obtained by adding each shift amount of FIG. 9C to the coordinate of each pixel in the original image (adding the shift amount to the coordinate of the sub-scanning direction).

FIG. 9E shows the first screen image which is the result obtained by the screen processing for the original image having 6×6 matrix in which all of the pixels have the gray color (having the gradation value of 100). In this case, the screen processing is carried out by using the dither threshold coordinate shown in FIG. 9D and by applying the dither threshold obtained by referring the dither threshold matrix of FIG. 3A. In each pixel, the dither threshold coordinate of the dither threshold applied to the pixel is indicated.

FIGS. 10A to 10E show an example of the processing result in case that the second screen processing unit 23 carries out the screen processing for each pixel in the original image by using the coordinate obtained by adding the shift amount determined by the shift amount determining unit 21 and +1 to the coordinate of the pixel in the original image, as the dither threshold coordinate, and by applying the dither threshold obtained by referring the dither threshold matrix, and the like.

FIG. 10A and FIG. 10B are the same as FIG. 9A and FIG. 9B, respectively. FIG. 10C shows each shift amount obtained by adding +1 to each shift amount determined by the shift amount determining unit 21 (each shift amount shown in FIG. 9C). FIG. 10D shows each dither threshold coordinate obtained by adding each shift amount shown in FIG. 10C to each dither threshold coordinate shown in FIG. 10A. Each dither threshold coordinate of FIG. 10D is obtained by adding each shift amount of FIG. 10C to the coordinate of each pixel in the original image (adding the shift amount to the coordinate of the sub-scanning direction).

FIG. 10E shows the second screen image which is the result obtained by the screen processing for the original image having 6×6 matrix in which all of the pixels have the gray color (having the gradation value of 100). In this case, the screen processing is carried out by using the dither threshold coordinate shown in FIG. 10D and by applying the dither threshold, obtained by referring the dither threshold matrix of FIG. 3A. In each pixel, the dither threshold coordinate of the dither threshold applied to the pixel is indicated.

FIGS. 11A to 11E show the variable magnification processing in which the variable magnification processing unit 24 uses the first screen image of FIG. 9E and the second screen image of FIG. 10E. In FIGS. 11A to 11E, in each pixel, the dither threshold coordinate of the dither threshold applied to the pixel is indicated.

FIG. 11A shows the first screen image of FIG. 9E. FIG. 11B shows the shift image obtained by shifting each pixel in the first screen image in the sub-scanning direction by the shift amount shown in FIG. 9C, by using the variable magnification processing unit 24. In the shift image, the lack pixels are caused.

FIG. 11C shows the second screen image of FIG. 10E. FIG. 11D shows the shift image obtained by shifting each pixel in the second screen image in the sub-scanning direction by the shift amount shown in FIG. 9C, by using the variable magnification processing unit 24.

FIG. 11E shows the output image obtained by the variable magnification processing in which the relevant pixels in the second screen image of FIG. 11C are inserted into the positions of the lack pixels shown in FIG. 11B as the insert pixels.

The pixels to be adopted as the insert pixels (referred to as the adopted pixels) are the pixels in the second screen image, which correspond to the pixels arranged on the positions which are shifted from the lack pixels in the shift direction by −1 in the shift image of FIG. 11B, among the second screen image (in the drawings, the pixels which are enclosed by the dashed rectangle).

The dither threshold coordinate of each adopted pixel is a correct dither threshold coordinate for the lack pixel. Therefore, the gradation value of each adopted pixel is the gradation value obtained by carrying out the screen processing for each pixel in the original image, which is arranged on the position shifted from each lack pixel in the shift direction by −1, by applying the correct dither threshold corresponding to the position of each lack pixel. By inserting the above adopted pixels into the positions of the lack pixels, in the output image shown in FIG. 11E, the form of the screen is maintained in the whole of the image including the lack pixels.

The variable magnification processing unit 24 may extract the adopted pixels from the second screen image without carrying out the shift processing for the second screen image, or may extract the adopted pixels from the shift image shown in FIG. 11D, which is prepared by carrying out the shift processing for shifting each pixel in the second screen image by the same shift amount as the first screen image. In the latter case, it is possible to easily recognize the adopted pixels arranged on the positions which are shifted from the lack pixels by −1, and extract the adopt pixels.

Next, the case in which the shift amount obtained by subtracting 1 from the shift amount determined by the shift amount determining unit 21 is used in the second screen processing unit 23, will be explained.

The first screen processing unit 22 executes the operation shown in FIGS. 9A to 9E.

FIGS. 12A to 12E shows an example of the processing result in case that the second screen processing unit 23 carries out the screen processing for each pixel in the original image by using the coordinate obtained by adding the shift amount determined by the shift amount determining unit 21 and −1 to the coordinate of the pixel in the original image, as the dither threshold coordinate, and by applying the dither threshold obtained by referring the dither threshold matrix, and the like.

FIG. 12A and FIG. 12B are the same as FIG. 9A and FIG. 9B, respectively. FIG. 12C shows each shift amount obtained by subtracting 1 from each shift amount determined by the shift amount determining unit 21 (each shift amount shown in FIG. 9C). FIG. 12D shows each dither threshold coordinate obtained by adding each shift amount shown in FIG. 12C to each dither threshold coordinate shown in FIG. 12A. Each dither threshold coordinate of FIG. 12D is obtained by adding each shift amount of FIG. 12C to the coordinate of each pixel in the original image (adding the shift amount to the coordinate of the sub-scanning direction).

FIG. 12E shows the second screen image which is the result obtained by the screen processing for the original image having 6×6 matrix in which all of the pixels have the gray color (having the gradation value of 100). In this case, the screen processing is carried out by using the dither threshold coordinate shown in FIG. 12D and by applying the dither threshold obtained by referring the dither threshold matrix of FIG. 3A. In each pixel, the dither threshold coordinate of the dither threshold applied to the pixel is indicated.

FIGS. 13A to 13E show the variable magnification processing in which the variable magnification processing unit 24 uses the first screen image of FIG. 9E and the second screen image of FIG. 12E. In FIGS. 13A to 13E, in each pixel, the dither threshold coordinate of the dither threshold applied to the pixel is indicated.

FIG. 13A shows the first screen image of FIG. 9E. FIG. 13B shows the shift image obtained by shifting each pixel in the first screen image in the sub-scanning direction by the shift amount shown in FIG. 9C, by using the variable magnification processing unit 24. In the shift image, the lack pixels are caused. FIG. 13A and FIG. 13B are the same as FIG. 11A and FIG. 11B, respectively.

FIG. 13C shows the same second screen image as that of FIG. 12E. FIG. 13D shows the shift image obtained by shifting each pixel in the second screen image in the sub-scanning direction by the shift amount shown in FIG. 9C, by using the variable magnification processing unit 24.

FIG. 13E shows the output image obtained by the variable magnification processing in which the relevant pixels in the second screen image of FIG. 13C are inserted into the positions of the lack pixels shown in FIG. 13B as the insert pixels.

The adopted pixels are the pixels in the second screen image, which correspond to the pixels arranged on the positions which are shifted from the lack pixels in the shift direction by +1 in the shift image of FIG. 13B, among the second screen image (in the drawings, the pixels which are enclosed by the dashed rectangle).

The dither threshold coordinate of each adopted pixel is a correct dither threshold coordinate for the lack pixel. Therefore, the gradation value of each adopted pixel is the gradation value obtained by carrying out the screen processing for each pixel in the original image, which is arranged on the position shifted from each lack pixel in the shift direction by −1, by applying the correct dither threshold corresponding to the position of each lack pixel. By inserting the above adopted pixels into the positions of the lack pixels, in the output image shown in FIG. 13E, the form of the screen is maintained in the whole of the image including the lack pixels.

The variable magnification processing unit 24 may extract the adopted pixels from the second screen image without carrying out the shift processing for the second screen image, or may extract the adopted pixels from the shift image shown in FIG. 13D, which is prepared by carrying out the shift processing for shifting each pixel in the second screen image by the same shift amount as the first screen image. In the latter case, it is possible to easily recognize the adopted pixels arranged on the positions which are shifted from the lack pixels by +1, and extract the adopt pixels.

In case that the second screen processing unit 23 adds 1 to the shift amount determined by the shift amount determining unit 21, the correct dither threshold for the position of each lack pixel is applied to the pixel adjacent to the upper side of each lack pixel in FIG. 11D. On the other hand, in case that the second screen processing unit 23 subtracts 1 from the shift amount, the correct dither threshold for the position of each lack pixel is applied to the pixel adjacent to the lower side of each lack pixel in FIG. 13D. In both methods, because the correct dither threshold for the position of each lack pixel is applied, the form of the screen is maintained. Further, the difference between the method for adding 1 to the shift amount and the method for subtracting 1 from the shift amount, is whether the upper pixel of each lack pixel or the lower pixel of each lack pixel is used. Therefore, any one of the above methods may be adopted.

Third Embodiment

In the second embodiment, the form of the screen is maintained in the output image obtained by carrying out the variable magnification processing. However, for example, in case that a line drawing which is drawn in black and white, such as characters, is enlarged, because the insert pixels are arranged on the identical line in the main scanning direction, the deterioration in the image quality is remarkably caused. Therefore, in the third embodiment, like the first embodiment, the positions of the insert pixels are dispersed. The schematic configuration of the image variable magnification device according to the third embodiment, is the same as that of FIG. 7. The explanation thereof is omitted.

As shown in FIG. 4, the shift amount determining unit 21 determines the shift amount of each pixel so as to disperse the positions of the pixels to be inserted or deleted, without being consecutive in the direction (second direction) perpendicular to the enlargement/reduction direction (first direction).

Firstly, the case in which the second screen processing unit 23 uses the shift amount obtained by adding +1 to the shift amount determined by the shift amount determining unit 21, is explained.

The processing result obtained by the first screen processing unit 21, and the like are the same as those of FIGS. 5A to 5E.

FIGS. 14A to 14E show an example of the processing result in case that the second screen processing unit 23 carries out the screen processing for each pixel in an original image by using the coordinate obtained by adding the shift amount determined by the shift amount determining unit 21 and +1 to the coordinate of the pixel in the original image, as the dither threshold coordinate, and by applying the dither threshold obtained by referring the dither threshold matrix.

FIG. 14A and FIG. 14B are the same as FIG. 5A and FIG. 5B, respectively. FIG. 14C shows the shift amount of each pixel in the original image, which is obtained by adding +1 to each shift amount determined by the shift amount determining unit 21 (the shift amount shown in FIG. 5C). The original image has 6×6 matrix in which all of the pixels have the gray color (having the gradation value of 100). FIG. 14D shows each dither threshold coordinate obtained by adding each shift amount shown in FIG. 14C to each dither threshold coordinate shown in FIG. 14A. Each dither threshold coordinate of FIG. 14D is obtained by adding each shift amount of FIG. 14C to the coordinate of each pixel in the original image (adding the shift amount to the coordinate of the sub-scanning direction).

FIG. 14E shows the second screen image which is the result obtained by the screen processing for the original image having 6×6 matrix in which all of the pixels have the gray color (having the gradation value of 100). In this case, the screen processing is carried out by using the dither threshold coordinate shown in FIG. 14D and by applying the dither threshold obtained by referring the dither threshold matrix of FIG. 3A. In each pixel, the dither threshold coordinate of the dither threshold applied to the pixel is indicated.

FIGS. 15A to 15E show the variable magnification processing in which the variable magnification processing unit 24 uses the first screen image of FIG. 5E and the second screen image of FIG. 14E. In FIGS. 15A to 15E, in each pixel, the dither threshold coordinate of the dither threshold applied to the pixel is indicated.

FIG. 15A shows the first screen image of FIG. 5E. FIG. 15B shows the shift image obtained by shifting each pixel in the first screen image in the sub-scanning direction by the shift amount shown in FIG. 5C, by using the variable magnification processing unit 24. In the shift image, the lack pixels are caused.

FIG. 15C shows the second screen image of FIG. 14E. FIG. 15D shows the shift image obtained by shifting each pixel in the second screen image in the sub-scanning direction by the shift amount shown in FIG. 5C, by using the variable magnification processing unit 24.

FIG. 15E shows the output image obtained by the variable magnification processing in which the relevant pixels in the second screen image of FIG. 15C are inserted into the positions of the lack pixels shown in FIG. 15B as the insert pixels.

The adopted pixels to be adopted as the insert pixels are the pixels in the second screen image, which correspond to the pixels arranged on the positions which are shifted from the lack pixels in the shift direction by −1 in the shift image of FIG. 15B, among the second screen image (in the drawings, the pixels which are enclosed by the dashed rectangle).

The dither threshold coordinate of each adopted pixel is a correct dither threshold coordinate for the lack pixel. Therefore, the gradation value of each adopted pixel is the gradation value obtained by carrying out the screen processing for each pixel in the original image, which is arranged on the position shifted from each lack pixel in the shift direction by −1, by applying the correct dither threshold corresponding to the position of each lack pixel. By inserting the above adopted pixels into the positions of the lack pixels, in the output image shown in FIG. 15E, the form of the screen is maintained in the whole of the image including the lack pixels.

The variable magnification processing unit 24 may extract the adopted pixels from the second screen image without carrying out the shift processing for the second screen image, or may extract the adopted pixels from the shift image shown in FIG. 15D, which is prepared by carrying out the shift processing for shifting each pixel in the second screen image by the same shift amount as the first screen image. In the latter case, it is possible to easily recognize the adopted pixels arranged on the positions which are shifted from the lack pixels by −1, and extract the adopt pixels.

Next, the case in which the shift amount obtained by subtracting 1 from the shift amount determined by the shift amount determining unit 21 is used in the second screen processing unit 23, will be explained.

The first screen processing unit 22 executes the operation shown in FIGS. 5A to 5E.

FIGS. 16A to 16E shows an example of the processing result in case that the second screen processing unit 23 carries out the screen processing for each pixel in the original image by using the coordinate obtained by adding the shift amount determined by the shift amount determining unit 21 and −1 to the coordinate of the pixel in the original image, as the dither threshold coordinate, and by applying the dither threshold obtained by referring the dither threshold matrix, and the like.

FIG. 16A and FIG. 16B are the same as FIG. 5A and FIG. 5B, respectively. FIG. 16C shows each shift amount obtained by subtracting 1 from each shift amount determined by the shift amount determining unit 21 (each shift amount shown in FIG. 5C). FIG. 16D shows each dither threshold coordinate obtained by adding each shift amount shown in FIG. 16C to each dither threshold coordinate shown in FIG. 16A. Each dither threshold coordinate of FIG. 16D is obtained by adding each shift amount of FIG. 16C to the coordinate of each pixel in the original image (adding the shift amount to the coordinate of the sub-scanning direction).

FIG. 16E shows the second screen image which is the result obtained by the screen processing for the original image having 6×6 matrix in which all of the pixels have the gray color (having the gradation value of 100). In this case, the screen processing is carried out by using the dither threshold coordinate shown in FIG. 16D and by applying the dither threshold obtained by referring the dither threshold matrix of FIG. 3A. In each pixel, the dither threshold coordinate of the dither threshold applied to the pixel is indicated.

FIGS. 17A to 17E show the variable magnification processing in which the variable magnification processing unit 24 uses the first screen image of FIG. 5E and the second screen image of FIG. 16E. In FIGS. 17A to 17E, in each pixel, the dither threshold coordinate of the dither threshold applied to the pixel is indicated.

FIG. 17A shows the first screen image of FIG. 5E. FIG. 17B shows the shift image obtained by shifting each pixel in the first screen image in the sub-scanning direction by the shift amount shown in FIG. 5C, by using the variable magnification processing unit 24. In the shift image, the lack pixels are caused. FIG. 17A and FIG. 17B are the same as FIG. 15A and FIG. 15B, respectively.

FIG. 17C shows the same second screen image as that of FIG. 16E. FIG. 17D shows the shift image obtained by shifting each pixel in the second screen image in the sub-scanning direction by the shift amount shown in FIG. 5C, by using the variable magnification processing unit 24.

FIG. 17E shows the output image obtained by the variable magnification processing in which the relevant pixels in the second screen image of FIG. 17C are inserted into the positions of the lack pixels shown in FIG. 17B as the insert pixels.

The adopted pixels are the pixels in the second screen image, which correspond to the pixels arranged on the positions which are shifted from the lack pixels in the shift direction by +1 in the shift image of FIG. 17B, among the second screen image (in the drawings, the pixels which are enclosed by the dashed rectangle).

The dither threshold coordinate of each adopted pixel is a correct dither threshold coordinate for the lack pixel. Therefore, the gradation value of each adopted pixel is the gradation value obtained by carrying out the screen processing for each pixel in the original image, which is arranged on the position shifted from each lack pixel in the shift direction by −1, by applying the correct dither threshold corresponding to the position of each lack pixel. By inserting the above adopted pixels into the positions of the lack pixels, in the output image shown in FIG. 17E, the form of the screen is maintained in the whole of the image including the lack pixels.

The variable magnification processing unit 24 may extract the adopted pixels from the second screen image without carrying out the shift processing for the second screen image, or may extract the adopted pixels from the shift image shown in FIG. 17D, which is prepared by carrying out the shift processing for shifting each pixel in the second screen image by the same shift amount as the first screen image. In the latter case, it is possible to easily recognize the adopted pixels arranged on the positions which are shifted from the lack pixels by +1, and extract the adopt pixels.

In the third embodiment, the form of the screen can be maintained. Further, because the positions of the insert pixels are dispersed, even though a line drawing which is drawn in black and white is enlarged, it is possible to suppress the deterioration in the image quality.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In at least one of the above embodiments, the enlargement and the reduction of the image and the shift processing in the sub-scanning direction are explained. Also in case of the variable magnification processing in the main scanning direction, basically, the same processing may be carried out.

The method for dispersing the shift amount, which is shown in the first embodiment and the third embodiment, is merely an example. The dispersing method is not limited to this. For example, the shift amount may be dispersed more widely than the shift amount shown in the embodiments, within the pixel insertion period.

Further, in at least one of the above embodiments, the screen processing and the variable magnification processing are carried out by a hardware pipe line process. The process for carrying out the variable magnification processing and the like is not limited to the pipe line process. For example, the variable magnification processing and the like shown in the embodiments may be carried out by software.

In the second embodiment and the third embodiment, the second screen processing unit 23 adds or subtracts 1 to/from the shift amount determined by the shift amount determining unit 21. However, the shift amount determining unit 21 may prepare the data relating to the shift amount obtained by adding or subtracting +1 to/from the shift amount output to the first screen processing unit 22 and the variable magnification processing unit 24, and may output the prepared data to the second screen processing unit 23.

That is, the shift amount determining unit 21 determines the first shift amount of each pixel according to the variable magnification ratio in case that an original image is variably magnified in the predetermined direction (the first direction) by inserting or deleting pixels, determines the second shift amount obtained by adding or subtracting 1 to/from the first shift amount, outputs the first shift amount to the first screen processing unit 22 and the variable magnification processing unit 24, and outputs the second shift amount to the second screen processing unit 23. The second screen processing unit 23 carries out the screen processing for each pixel in the original image by applying the dither threshold on the position in the dither threshold matrix, which corresponds to the position obtained by adding the second shift amount for the pixel to the position of the pixel. The first screen processing unit 22 and the variable magnification processing unit 24 carry out the operation shown in the embodiments. Also in the above operation of image variable magnification device, the effect which is the same as that of the second embodiment and the third embodiment can be obtained.

The dither threshold matrix shown in the embodiments is merely an example. The dither threshold matrix is not limited to this. The size of the dither threshold matrix and each dither threshold can be optionally set.

In the above embodiments, the following binarizing process is shown as the screen processing. In the binarizing process, the dither threshold is compared with the pixel value (the density, the gradation value or the like) in the original image. In case that the pixel value in the original image exceeds the dither threshold, the value 255 (black) is output. In other cases, the value 0 (white) is output. However, the screen processing is not limited to the above binarizing process. For example, like the multiple-value screen processing, the value between 0 and 255 may be obtained according to the difference between the dither threshold and the pixel value in the original image.

The image variable magnification device 10 or 20 is configured as an independent device. Alternatively, for example, the image variable magnification device 10 or 20 may be incorporated into an image forming apparatus having the print function or the copy function.

One of the objects of the above embodiment is to provide an image variable magnification device and an image variable magnification method which can suppress the deterioration in the form of the screen even though the variable magnification processing is carried out for the image after the screen processing.

In at least one of the above embodiments, the first screen processing unit carries out the screen processing for the original image by applying the dither threshold corresponding to the position of each pixel in case that the shift processing for the variable magnification of the image is carried out. The second screen processing unit carries out the screen processing for the original image by applying the dither threshold corresponding to the position obtained by adding +1 or −1 to the shift amount used in the first screen processing unit. When the variable magnification processing unit carries out the shift processing for the image prepared by the first screen processing unit, the lack portion in which the pixel is lacked is caused at the position at which the shift amount is changed. Therefore, it is necessary to insert the pixel in the lack portion. Because in the screen image prepared by the second screen processing unit, the pixels obtained by carrying out the screen process by using each dither threshold corresponding to the pixel position of the above lack portion are present, the relevant pixels in the screen image prepared by the second screen processing unit are adopted as the insert pixels. Therefore, the form of the screen can be maintained in the whole of the image including the insert pixels, which is obtained by the variable magnification processing.

In at least one of the above embodiments, the shift amount determining unit prepares the second shift amount obtained by adding or subtracting 1 to/from the shift amount used for the variable magnification. The second screen processing unit carries out carries out the screen processing by using the dither threshold on the position obtained by adding the second shift amount for each pixel to the position of the pixel.

In at least one of the above embodiments, because the positions of the pixels to be inserted are determined so as to disperse the positions without being consecutive in the second direction, the deterioration in the image quality is suppressed even in an image including characters or the like.

In at least one of the above embodiments, when the shift amount used for the variable magnification is determined, the positions of the pixels to be inserted in the image obtained by the variable magnification processing are determined so as to disperse the positions without being consecutive in the direction perpendicular to the variable magnification direction. The screen processing unit carries out the screen processing for the original image by applying the dither threshold corresponding to the position of each pixel in case that the shift processing is carried out by using the determined shift amount. When the variable magnification processing unit carries out the shift processing for the image obtained by the screen processing, the lack portion in which the pixel is lacked is caused at the position at which the shift amount is changed. The gradation value of the pixel to be inserted into the lack portion is determined by the interpolation in accordance with the pixels arranged around the pixel to be inserted. In the above variable magnification processing, the form of the screen is maintained except the pixels to be inserted. Further, because the positions of the pixels to be inserted are dispersed, the deformation of the form of the screen is not remarkable at the position of the insert pixel. Because the positions of the pixels to be inserted are not consecutive, many pixels arranged around the pixel to be inserted can be used in order to determine the gradation value of the pixel to be inserted. As a result, the gradation value of the pixel to be inserted can be set to a suitable value.

According to the image variable magnification device and the image variable magnification method, it is possible to suppress the deterioration in the form of the screen even though the variable magnification processing is carried out for the image after the screen processing.

The present U.S. patent application claims the priority of Japanese Patent Application No. 2013-174999, filed on Aug. 26, 2013, according to the Paris Convention, and the entirety of which is incorporated herein by reference for correction of incorrect translation.

What is claimed is:

1. An image variable magnification device, comprising:
   a shift amount determining unit that determines a shift amount for each pixel in case that an original image is variably magnified in a first direction by inserting or deleting pixels;
   a first screen processing unit that carries out a first screen processing for each pixel in the original image by applying a dither threshold on a position, in a dither threshold matrix stored in memory, obtained by adding the shift amount for the pixel to a position of the pixel;
   a second screen processing unit that carries out a second screen processing for each pixel in the original image by applying a dither threshold on a position, in the dither threshold matrix, obtained by adding the shift amount for the pixel and +1 or −1 to the position of the pixel; and
   a variable magnification processing unit that shifts each pixel in an image obtained by carrying out the first screen processing in the first screen processing unit, in accordance with the shift amount determined by the shift amount determining unit, and that determines a gradation value of a pixel required to be inserted due to the shift, by adopting a processing result obtained by the second screen processing unit.

2. The image variable magnification device of claim 1, wherein the shift amount determining unit determines the shift amount for each pixel to disperse positions of the pixels to be inserted or deleted, without being consecutive in a second direction perpendicular to the first direction.

3. An image variable magnification device, comprising:
   a shift amount determining unit that determines a first shift amount for each pixel in case that an original image is variably magnified in a first direction by inserting or deleting pixels, and that determines a second shift amount obtained by adding or subtracting 1 to/from the first shift amount;
   a first screen processing unit that carries out a first screen processing for each pixel in the original image by applying a dither threshold on a position, in a dither threshold matrix stored in memory, obtained by adding the first shift amount for the pixel to a position of the pixel;
   a second screen processing unit that carries out a second screen processing for each pixel in the original image by applying a dither threshold on a position, in the dither threshold matrix, obtained by adding the second shift amount for the pixel to the position of the pixel; and
   a variable magnification processing unit that shifts each pixel in an image obtained by carrying out the first screen processing in the first screen processing unit, in accordance with the first shift amount determined by the shift amount determining unit, and that determines a gradation value of a pixel required to be inserted due to the shift, by adopting a processing result obtained by the second screen processing unit.

4. The image variable magnification device of claim 3, wherein the shift amount determining unit determines the first shift amount for each pixel to disperse positions of the pixels to be inserted or deleted, without being consecutive in a second direction perpendicular to the first direction.

5. An image variable magnification method, comprising:
   determining a shift amount for each pixel in case that an original image is variably magnified in a first direction by inserting or deleting pixels;

carrying out a first screen processing for each pixel in the original image by applying a dither threshold on a position, in a dither threshold matrix stored in memory, obtained by adding the determined shift amount for the pixel to a position of the pixel;

carrying out a second screen processing for each pixel in the original image by applying a dither threshold on a position, in the dither threshold matrix, obtained by adding the determined shift amount for the pixel and +1 or −1 to the position of the pixel; and shifting each pixel in an image obtained by carrying out the first screen processing, in accordance with the determined shift amount, and determining a gradation value of a pixel required to be inserted due to the shifting, by adopting a processing result obtained by carrying out the second screen processing.

6. The image variable magnification method of claim 5, wherein the shift amount for each pixel is determined to disperse positions of the pixels to be inserted or deleted, without being consecutive in a second direction perpendicular to the first direction.

7. An image variable magnification method, comprising:

determining a first shift amount for each pixel in case that an original image is variably magnified in a first direction by inserting or deleting pixels, and determining a second shift amount obtained by adding or subtracting +1 to/from the first shift amount;

carrying out a first screen processing for each pixel in the original image by applying a dither threshold on a position, in a dither threshold matrix stored in memory, obtained by adding the determined first shift amount for the pixel to a position of the pixel;

carrying out a second screen processing for each pixel in the original image by applying a dither threshold on a position, in the dither threshold matrix, obtained by adding the determined second shift amount for the pixel to the position of the pixel; and shifting each pixel in an image obtained by carrying out the first screen processing, in accordance with the determined first shift amount, and determining a gradation value of a pixel required to be inserted due to the shifting, by adopting a processing result obtained by carrying out the second screen processing.

8. The image variable magnification method of claim 7, wherein the first shift amount for each pixel is determined to disperse positions of the pixels to be inserted or deleted, without being consecutive in a second direction perpendicular to the first direction.

* * * * *